United States Patent Office 3,649,546
Patented Mar. 14, 1972

3,649,546
NON-HAZARDOUS KETONE PEROXIDE
POLYMERIZATION INITIATORS
Chester M. McCloskey, Altadena, and Donald E. Rees and George Hoff, Glendora, Calif., assignors to The Norac Company, Inc., Azusa, Calif.
No Drawing. Continuation-in-part of applications Ser. No. 638,643, May 15, 1967, and Ser. No. 653,617, July 17, 1967. This application Aug. 17, 1970, Ser. No. 64,661
Int. Cl. C07c 73/00; C08f 1/60
U.S. Cl. 252—186
20 Claims

ABSTRACT OF THE DISCLOSURE

Esters boiling from 140–250° C. are disclosed as effective phlegmatizers for lower ketone peroxides.

This invention relates to new nonhazardous polymerization initiator compositions. This applications is a continuation in part of copending applications Ser. No. 638,643 filed May 15, 1967 and now Pat. No. 3,557,009 and Ser. No. 653,617 filed July 17, 1967 and now abandoned.

It is an object of this invention to provide ketone peroxide compositions that are free from the explosive decomposition that ketone peroxides normally exhibit when heated to high temperatures.

It is another object of this invention to provide ketone peroxide compositions that have good storage stability, and are efficient initiators for the polymerization of ethylenically unsaturated compounds.

Ketone peroxides are used extensively for the initiation of polymerization of ethylenically unsaturated compounds and their use is well known in the art. While thermal initiation is often employed they have found their most extensive use in the so-called room temperature polymerizations employing a soluble sicative metal salt such as cobalt octoate, with the "unsaturated polyester resins." These resins are composed of an unsaturated alkyd resin dissolved in a monomer such as styrene or methyl methacrylate.

A wide range of ketone peroxides have been employed but the most common ones have been prepared from methyl ethyl ketone, cyclohexanone and methyl amyl ketone. The hazardous nature of organic peroxides in general and ketone peroxides in particular is well known in the art. The ketone peroxides prepared from the higher molecular weight ketones such as methyl amyl ketone, in which the active oxygen content is lower, do not require diluents in order to be handled with reasonable safety. The peroxides prepared from the lower molecular weight ketones in which the active oxygen content is higher require diluents for safe handling. The most commonly employed diluents are dimethyl phthalate. The active oxygen concentration is usually adjusted to around 11%. While these diluents provide reasonable safety for ordinary handling, even ketone peroxides diluted to 11% active oxygen concentration may decompose explosively when held at high temperatures for a prolonged period of time.

The ketone peroxide in widest general use at the present time is methyl ethyl ketone peroxide. The commerical material is commonly marketed as a 60% solution in dimethyl phthalate with an active oxygen concentration of 11%. Cyclohexanone peroxide is marketed as an 85% paste or moist solid with dibutyl phthalate as the diluent and an active oxygen concentration of 11%. Cyclohexanone peroxide is also marketed as a solution in combination with methyl ethyl ketone peroxide employing dimethyl phthalate as the diluent at an active oxygen concentration of 11%.

A composition can be obtained by sufficient dilution of the ketone peroxide with dimethyl phthalate that does not exhibit explosive decomposition even when boiled to dryness. With simple compositions this occurs in the range of 40–48% methyl ethyl ketone peroxide depending on the concentration of free hydrogen peroxide. The dilute solutions, however, have not found general acceptance because of the added expense of the diluent, the resulting higher freight and container cost and the desire to minimize the amount of inactive diluent in many formulations.

The term "nonhazardous" as used herein encompasses primarily suppression of the rapid decomposition exhibited by ketone peroxides when heated to high temperatures which results in explosions or detonations even when unconfined. It is understood that some of the compositions that are "nonhazardous" by this definition may burn readily or even accelerate during burning as do most organic peroxides.

The term "phlegmatizer" is used in explosive technology to describe materials or compounds that desensitize or stabilize. While the diluents commonly employed with ketone peroxides can properly be classed as phlegmatizers for simplification, the term is reserved herein to refer exclusively to the suppression of the explosive decomposition of these materials.

The term "ketone peroxides" as used herein is used in the common sense and refers to the monomers or open chain polymers of the hydroxy-hydroperoxides or dihydroxy peroxides which are formed from ketones and hydrogen peroxide and which are in general commercial use. It is intended to include the cyclicpolymeric ketone peroxides which do not readily undergo redox decomposition with soluble salts of sicative metals, which do not have general application as polymerization initiators and which in many cases are highly explosive in nature. In addition to the ketone peroxide and diluent, small amounts of water and hydrogen peroxide are often present.

It has been discovered in accordance with the present invention that esters are effective phlegmatizers or desensitizers for ketone peroxides and suppress the rapid accelerating decomposition that results in explosions when these peroxides are heated to high temperatures. It has been further discovered that not all esters are active and that the effectiveness of the ester is related to the boiling point. Thus, at a given active oxygen concentration a relatively small concentration of an ester with a boiling point in the optimum part of the range will be as effective as much larger concentrations of esters boiling under the edges of the range.

Nonflammability of the diluent is not a major factor in suppressing explosive decomposition since highly halogenated compounds were not observed to contribute to the phlegmatization of the ketone peroxide systems.

Ethers were not found to be effective. The only compounds in both groups that exhibited significant stabilizing action boiled in the 170°–195° C. range further substantiating the importance of the boiling point.

The alkoxyalkyl esters and the B-keto esters both are effective stabilizers and suppress the explosive decomposition of ketone peroxides. The keto esters particularly however, accelerate somewhat the loss of activity of ketone peroxides during storage and are most useful where long time storage is not required.

Esters boiling in the range of 140°–250° C. are effective in suppressing explosive decomposition but the range 145°–218° C. is particularly effective with an optimum effectiveness between 150°–195° C. The loss of activity of an ester falls off quite rapidly at the lower boiling point range but diminishes slowly at the higher boiling point range. There is some variation in phlegmatizing activity with structure but it is not a major factor compared to the boiling point of the ester.

In practical use, esters boiling in the range of 170°–218° C. are usually employed since the higher boiling diluents have higher flash points as well and thus a lower flammability hazard.

As stated before, the primary requirements for a "nonhazardous" composition depends on three parameters: the concentration of the ester and the boiling point of the ester. Thus at an active oxygen concentration of 11% and near the edges of the effective boiling point range, all of the phlegmatizing diluent would be such an ester in order to give a nonhazardous composition, while a concentration of only 5 to 15% of the total composition is required of an ester boiling in the optimum part of the boiling point range. On the other hand, employing such an ester as the entire diluent, the active oxygen concentration can be increased above 11% to over 14%. As the active oxygen content is decreased, the concentration of phlegmatizing ester can also be decreased until the active oxygen concentration reaches the level of approximately 7.3% (40% methyl ethyl ketone peroxide when dimethyl phthalate is employed as the diluent), at which concentration no phlegmatizing ester at all is required. At this point 1% phlegmatizing ester is all that is required. In practice, however, 3–4% is usually employed. The examples illustrate principally the minimum concentration of phlegmatizing diluent required. Thus at higher concentrations a lower hazard composition would be obtained and the concentration would be limited only by the desired dilution of the ketone peroxide. A concentration of phlegmatizing ester of 60% is a practical commercial limit.

There is a variation in hazard from one preparation of a ketone peroxide to another, since most preparations are mixtures of several structures. Preparations of higher hazard require a higher percentage of phlegmatizing ester. As stated previously the ketone peroxides that are especially operative are those of the lower ketones (4–7 carbon atoms) and a higher concentration of phlegmatizing ester is required for the lower members than for higher members.

Monocarboxylic acid esters of monohydric and dihydric alchols, dicarboxylic acid esters of monohydric alcohols and carbonates of monohydric alochols are all effective phlegmatizing esters. In practice it has been found that the useful esters unsubstituted by other than hydrocarbon groups fall within the composition range where the sum of the oxygen and carbon atoms is from 9 to 16 in the boiling point range of 140 to 250° C. and from 9 to 14 in the boiling point range from 170 to 218° C. The monocarboxylic acid esters containing two oxygen atoms, the carbonates containing three oxygen atoms, and the dicarboxylic acid esters and monocarboxylic acid diesters of glycols containing four oxygen atoms are all active. The carboxylic acid can be aromatic, alkyl-substituted aromatic, branched and straight chain, aliphatic and cycloaliphatic. The alcohols can be aralkyl, cycloalkyl, branched and straight chain alkyl, monohydric alcohols; dihydric alkyl glycols and cycloalkyl alcohols. Typical esters are normal and isopentyl acetate; n-hexyl acetate; 2-ethylhexyl acetate; benzyl acetate; methyl, ethyl and isopropyl benzoate; n-butyl, isoamyl, sec-amyl and n-hexyl pivalate; methyl and n-butyl neodecanoate; propylene glycol diacetate; ethylene glycol diacetate; cyclohexyl acetate; neopentyl acetate; methyl 2-ethylhexanoate; n-heptyl and n-octyl formate; dipropyl and dibutyl carbonate; isoamyl propionate; sec-amyl proprionate; dimethyl and diethyl succinate; dimethyl and diethyl malonate; methyl ethyl succinate; diethyl oxalate and methyl p-toluate.

Hydroxyalkyl esters and alkyl esters of hydroxy acids are both effective within the 140 to 250° C. boiling point range. With the hydroxyalkyl esters, there is some activity still at 275° C. and the availability of these esters boiling below 180° C. makes this the lower limit for practical purposes. The hydroxy-esters discussed herein are carboxylic acid esters. The esters of the hydroxyacids although not readily available are particularly effective. In both groups the carbon-oxygen composition range is altered compared to the unsubstituted esters by the introduction of the hydroxyl group, however, the functional properties are similar. Both hydroxyesters are particularly useful when it is desired to incorporate larger amounts of water or hydrogen peroxide than the unsubstituted esters will permit. The hydroxy-esters are highly soluble in resins and monomers. The hydroxy-alkyl pivolates are especially useful because of their phlegmatizing efficiency and their stability to hydrolysis. Esters of glycol monoethers and alkane carboxylic acids, boiling in the 145 to 218° C. range are effective phlegmatizers as noted earlier and have important solvent properties in addition.

Functionally substituted esters other than those discussed above often seriously alter the polymerization process although selected compounds may be operative such as certain halogen substituted esters.

While the phlegmatizing ester can be employed as the entire diluent or partial diluent and incorporated at the time of the preparation of the peroxide, it is common for the phlegmatizer to be added in an effective concentration after preparation with a processing diluent such as dimethyl phthalate or dibutyl phthalate. Other diluents often incorporated in ketone peroxide compositions are 2-ethyl-1-hexanol, ethyl acetate, diallyl phthalate, dibutyl phthalate, butyl Cellosolve, propylene glycol, hexylene glycol and n-methyl pyrolidone. It is necessary, however, that the phlegmatizing diluent be compatible with other diluents employed. If the latter boil below 140° C., then the concentration of the phlegmatizing diluent compared to the ketone peroxide should be increased over the amount that would otherwise be required. Similarly, if the processing diluent boils at a very high temperature, e.g. 300–400° C., then the relative amount of phlegmatizing ester must also be increased.

Esters can be combined with other phlegmatizing diluents such as alchols, glycols, ethers or alkyl amides where compatibility permits, to obtain desired physical properties as well as a nonhazardous composition often at a lower ester concentration.

Esters boiling in the 140–250° C. range are also effective phlegmatizers with ketone peroxide compositions containing hydrogen peroxide even though hydrogen peroxide increases the violence of decomposition of ketone peroxide compositions that employ dimethyl phthalate alone as the diluent. A considerable range of hydrogen peroxide concentrations can be employed safely but is limited in practical applications due to the adverse effect of large concentrations of hydrogen peroxide on the efficiency of the composition as a polymerization initiator and on solubility limitations. A hydrogen peroxide concentration as high as 7½% can be employed but 5% is a common limit. While most ketone peroxide compositions contain small amounts of water, the addition of water in some cases makes them more hazardous than before. Employing the esters of the instant invention, a large range of water can be present even in combination with hydrogen peroxide. Compatability with the esters usually limits the water concentration to 10% or less.

Other compatible organic peroxides may be present in addition to the ketone peroxides providing that they do not change greatly the basic hazard of the composition.

The storage stability of ketone peroxide compositions containing esters varies depending on the structure of the particular ester employed but is comparable to those in commercial use.

Esters, in most cases, have a minor influence on the effectiveness of the compositions as polymerization initiators. Such variations that exist are primarily related to the structure of the ester, particularly the presence of secondary or tertiary hydrogen atoms that may participate in chain transfer or other free radical processes. These are variations that are well understood in the art and exist in current commercial formulations.

In the terminology employed in the claims "aryl" or "aromatic" includes also alkyl substituted aromatic and aralkyl, and "alkyl" or "alkane" includes also cycloalkyl and aralkyl and the corresponding alkanes.

EXAMPLE 1

The typical "unsaturated polyester resin," or polyester resin, as they are commonly called in the trade, used in the following examples was prepared as follows: 65 parts alkyl resin, acid No. 45-50 prepared from 1 mole maleic anhydride, 1 mole phthalic anhydride and 2.2 moles propylene glycol, plus 35 parts styrene, 0.13 part hydroquinone and 0.03 part of cobalt as cobalt octoate.

EXAMPLE 2

The term PVT test in the examples, refers to a pressure vessel test developed in Holland by Dr. E. W. Lindeijer at the Technological Laboratory of the National Defense Research Organization and work with it in this country is described by O. T. Mageli et al., Ind. Eng. Chem. 56, 18 (1964). It consists essentially of a pressure vessel into which a sample is placed in a standard metal cup. On top is fitted a burst diaphram calibrated for 100 p.s.i. On the side is a fitting into which discs having varying apertures can be inserted. Using a standard heating rate, the smallest aperture that can be tolerated without rupture of the burst diaphram is determined for a given compound. The smaller the aperature the less hazardous the compound.

EXAMPLE 3

The TCT Test in the following examples refers to a test developed by Mr. Howard Greer of Bel Air, Tex. It consists essentially of placing 100 ml. of the composition to be tested in a steel can similar to those used for frozen juice, inserting a 250 watt immersion heater and observing the results of heating to destruction. The sample may boil to dryness, catch fire, pop, or explode violently depending on the composition. The can may be left standing intact or in violent explosion, completely disintegrated. It has been found to be at least as reproducible as the PVT Test. Like the latter, it must be run under standardized conditions but is an effective procedure for determining the behavior of peroxide compositions under severe conditions.

EXAMPLE 4

Preparation of ketone peroxides

Methyl ethyl ketone peroxide compositions were obtained by reacting 150 g. methyl ethyl ketone, 159 g. of 50% hydrogen peroxide and 115 g. of the phlegmatizer in the presence of 1.5 g. of sulfuric at 55° C. for one hour. The reaction product was dried over sodium sulfate, the unreacted methyl ethyl ketone removed by distillation. The desired concentration of methyl ethyl ketone peroxide composition was obtained by the addition of phlegmatizer.

EXAMPLE 5

The following esters were tested for effectiveness in suppressing explosive decomposition of methyl ethyl ketone peroxide as follows: to 100 g. of a composition of methyl ethyl ketone peroxide and dimethyl phthalate with an active oxygen content of 11.6% was added 10 g. of additive to give a final active oxygen content of 10.55%. The additive thus constitutes about 2½% of the diluent present. The TCT Test is described in Example 3. Water and hydrogen peroxide were run as controls.

| Diluent | Boiling point, °C. | TCT Test |
|---|---|---|
| Ethyl acetate | 75 | Explosion. |
| Isopropyl acetate | 85-90 | Do. |
| n-Butyl acetate | 123-6 | Do. |
| Isopentyl acetate | 140-2 | Mild explosion. |
| n-Pentyl acetate | 144-7 | Fire only. |
| n-Hexyl acetate | 164-7 | Do. |
| Cyclohexyl acetate | 173-5 | Do. |
| 2-ethyl-1-hexyl acetate | 192-205 | Do. |
| Methyl benzoate | 199.5 | Explosion variable. |
| Ethyl benzoate | 212 | Do. |
| Benzyl acetate | 213.5 | Do. |
| Diethyl succinate | 217 | Mild explosion. |
| Isopropyl benzoate | 218 | Explosion. |
| Dimethyl phthalate | 282 | Do. |
| Butyl benzyl phthalate | 370 | Do. |
| Water | 100 | Do. |
| Hydrogen peroxide 25% | | Do. |

EXAMPLE 6

The following compounds were tested as described in Example 5.

| Additive | Boiling point, °C. | TCT Test |
|---|---|---|
| 2-methoxyethyl acetate | 145 | Fire. |
| 2-ethoxyethyl acetate | 153-7 | Do. |
| Methyl acetoacetate | 166-75 | Do. |
| Ethyl acetoacetate | 170-85 | Do. |
| Ethyl benzoxyacetate | 265 | Mild explosion. |

EXAMPLE 7

The following ketone peroxide compositions containing ethyl benzoate were tested by the TCT Test as described in Example 3.

| Composition | Percent | TCT Test |
|---|---|---|
| Cyclohexanone peroxide | 85 | Fire. |
| Ethyl benzoate | 15 | |
| Methyl ethyl ketone peroxide | 55 | Fire. |
| Cyclohexanone peroxide | 22½ | |
| Ethyl benzoate | 22½ | |
| Methyl ethyl ketone peroxide | 45 | Explosion. |
| Cyclohexanone peroxide | 17 | |
| Dimethyl phthalate | 38 | |

EXAMPLE 8

A series of methyl ethyl ketone peroxide compositions were tested by the TCT Test described in Example 3.

| Diluent | Active oxygen content, percent | Boiling point, °C. | TCT Test |
|---|---|---|---|
| Isopropyl acetate | 11 | 85 | Severe explosion. |
| Cyclohexyl acetate | 13.9 | 177 | Fire. |
| 2-ethyl-1-hexyl acetate | 11 | 199.3 | Do. |
| | 13.7 | 199.3 | Do. |
| Methyl benzoate | 11 | 199.6 | Do. |
| | 12.3 | 199.6 | Do. |
| Isopropyl benzoate | 11 | 218 | Do. |
| Butyl benzoate | 11 | 250 | Mild report. |
| Dimethyl phthalate | 11 | 282 | Explosion. |

EXAMPLE 9

A series of compositions of methyl ethyl ketone peroxide, prepared as described in Example 4 with various esters as diluents, were diluted with varying amounts of 50% hydrogen and evaluated by the TCT Test of Example 3.

| Methyl ethyl ketone peroxide, percent | Cyclohexyl acetate, percent | 50 percent hydrogen peroxide, percent | Active oxygen, percent | TCT Test |
|---|---|---|---|---|
| 53.1 | 41.9 | 5 | 11 | Fire. |
| 46.5 | 43.5 | 10 | 11 | Do. |
| 68.6 | 22.4 | 10 | 14.9 | Do. |
| 53.1 | [1] 41.9 | 5 | 11 | Do. |
| 53.1 | [2] 41.9 | 5 | 11 | Do. |
| 46.5 | 43.5 | 10 | 11 | Do. |
| 53.1 | [3] 41.9 | 5 | 11 | Explosion. |
| 53.1 | 41.9 | [4] 5 | 9.75 | Do. |

[1] 2-ethyl-1-hexyl acetate.
[2] Methyl benzoate.
[3] Dimethyl phthalate.
[4] Water.

EXAMPLE 10

Ketone peroxide compositions were evaluated by the PVT Test described in Example 2.

| Composition | Percent | PVT Test |
|---|---|---|
| Methyl ethyl ketone peroxide | 45 | |
| Cyclohexanone peroxide | 17 | Passes. |
| Ethyl benzoate | 38 | |
| Methyl ethyl ketone peroxide | 45 | |
| Cyclohexanone peroxide | 17 | Fails. |
| Domethyl phthalate | 38 | |

EXAMPLE 11

The following diluents were tested as described in Example 5.

| Additive | Boiling point, °C. | TCT Test |
|---|---|---|
| Halogenated compounds: | | |
| Bromoethane | 40 | Explosion. |
| 1,1,1-trichloroethane | 72-8 | Do. |
| 1,1,2-trichloroethane | 114 | Do. |
| Bromoform | 150 | Do. |
| 1,2,3-trichloropropane | 156 | Do. |
| 3-chloromethylpentane | 171-3 | Variable. |
| 2-ethyl-1-chlorohexane | 174 | Do. |
| 0-dichlorobenzene | 179-83 | Explosion. |
| Chlorinated biphenyl (21%) | 275-325 | Do. |
| Chlorinated biphenyl (32%) | 290-325 | Do. |
| Ethers: | | |
| Dioxane | 101 | Explosion. |
| Dibutyl ether | 142 | Do. |
| Anisole | 154-5 | Do. |
| Phenetole | 172 | Mild explosion. |
| Diphenyl ether | 259 | Explosion. |

EXAMPLE 12

Samples of the compositions listed were stored at 110° F. for a period of 30 days and the decrease in active oxygen content determined.

| | Percent | |
|---|---|---|
| | Start | 30 days |
| 60% methyl ethyl ketone peroxide 40% dimethyl phthalate | 11 | 10.9 |
| 60% methyl ethyl ketone perodixe 40% ethyl benzoate | 11 | 10.9 |

EXAMPLE 13

The polymerization initiation characteristics of several methyl ethyl ketone peroxide formulations containing various esters were determined with the "polyester resin" of Example 1. The methyl ethyl ketone peroxide compositions were obtained by diluting 100 parts of a 60% methyl ethyl ketone peroxide solution in dimethyl phthalate with 42½ parts of the ester given below. A concentration of 1½% ketone peroxide composition was employed and a temperature of 25° C.

| Diluent | Minutes | |
|---|---|---|
| | Time to gel | Time gel to cure [1] |
| 2-ethyl-1-hexyl acetate | 44 | 137 |
| Methyl benzoate | 48 | 148 |
| Isopropyl benzoate | 43 | 137 |
| Benzyl acetate | 44 | 139 |
| Dimethyl phthalate | 42 | 133 |

[1] Reading of 10 on a Barcol Impressometer.

EXAMPLE 14

Methyl ethyl ketone peroxide compositions prepared as described in Example 4 were evaluated by the PVT Test described in Example 2.

| Diluent | Concentration, percent | Active oxygen, percent | Boiling point, °C. | PVT test, 4 mm. orifice |
|---|---|---|---|---|
| Dimethyl phthalate | 9 | 10.6 | 282 | Fails. |
| Octyl formate | 9 | 10.6 | 82 | Passes. |
| Propyl carbonate | 9 | 10.6 | 168 | Do. |
| Ethyl benzoate | 9 | 10.6 | 212 | Do. |
| 2-ethylhexyl acetate | 9 | 10.6 | 199 | Do. |
| Diethyl succinate | 9 | 10.6 | 217 | Do. |
| Ethylene glycol diacetate | 9 | 10.75 | 189 | Do. |
| Propylene glycol diacetate | 9 | 10.75 | 186 | Do. |

EXAMPLE 15

The polymerization initiation and aging characteristics were determined on a methyl ethyl ketone peroxide formulation containing the following additives was tested as described in Examples 12 and 13.

| Diluent | Concentration, percent | Time to gel, min. | Time to cure,[1] min. | Active oxygen, percent [2] | |
|---|---|---|---|---|---|
| | | | | Start | After 30 days |
| Dimethyl phthalate | 9 | 46 | 141 | 10.6 | 10.6 |
| Heptyl formate | 9 | 49 | 141 | 10.65 | 10.6 |
| Dipropyl carbonate | 9 | 49 | 147 | 10.6 | 10.6 |
| Dibutyl carbonate | 9 | 48 | 146 | 10.6 | 10.6 |
| Ethyl benzoate | 9 | 48 | 150 | 10.6 | 10.65 |
| Dimethyl malonate | 9 | | | 10.65 | 10.6 |
| Diethyl succinate | 9 | | | 10.65 | 10.75 |
| Diethyl oxalate | 9 | | | 10.6 | 10 |
| n-Butyl pivalate | 9 | 44 | 141 | | |

[1] Reading of 10 on Barcol Impressometer.
[2] Accelerated aging 47° C.

EXAMPLE 16

Methyl ethyl ketone peroxide compositions prepared in dimethyl phthalate and containing the following additions in the concentrations given were evaluated by the TCT Test of Example 3.

| Diluent | Concentration, percent | Active oxygen, percent | TCT Test |
|---|---|---|---|
| Dimethyl phthalate only. | | 9.2 | Variable to mild report. |
| Do | | 9.8 | Moderate report. |
| Do | | 10.1 | Moderate-severe report. |
| Do | | 10.3 | Severe report. |
| Do | | 11 | Explosion. |
| Ethyl benzoate | 1 | 9.2 | Smoke and fire. |
| Do | 2 | | Fire. |
| Do | 1 | 9.9 | Mild to moderate report. |
| Do | 4.5 | 11.5 | Fire. |
| n-Amyl pivalate | 1 | 9.2 | Variable-mild report. |
| Do | 2 | 9.2 | Do. |
| Do | 5 | 9.2 | Do. |
| 2-ethylhexyl acetate | 5 | 9.2 | Do. |
| Do | 1 | 9.9 | Mild-moderate report. |
| Do | 2 | 11 | Explosion |
| Do | 5.7 | | Do. |
| 2-ethylhexyl acetate 2-ethylhexyl chloride | 2.25 2.25 | } 11.6 | Variable-mild report. |
| 2-ethylhexyl acetate 2-ethylhexyl chloride | 4.5 4.5 | } 11.6 | Variable-moderate report. |
| 2-ethylhexyl acetate n-Pentyl ether | 2 2 | } 11.6 | Moderate report. |

EXAMPLE 17

Methyl ethyl ketone peroxide compositions were prepared and tested as in Example 5.

| Diluent | Concentration, percent | Active oxygen, percent | Boiling point, °C. | TCT test |
|---|---|---|---|---|
| Dimethyl phthalate | 9 | 10.6 | 282 | Explosion. |
| Heptyl formate | 9 | 10.6 | 176 | Mild report. |
| Octyl formate | 9 | 10.6 | 198 | Do. |
| Dipropyl carbonate | 9 | 10.6 | 168 | Fire. |
| Dibutyl carbonate | 9 | 10.6 | 207 | Do. |
| Dimethyl succinate | 9 | 10.6 | 196 | Do. |
| Diethyl succinate | 9 | 10.6 | 207 | Fire—slight report. |
| Dimethyl malonate | 9 | 10.6 | 180 | Smoke—fire. |
| Do | 27 | 8 | 180 | Fire. |
| n-Butyl pivalate | 9 | 10.6 | 162 | Do. |
| n-Amyl pivalate | 9 | 10.6 | 184 | Fire—mild report. |
| n-Hexyl pivalate | 9 | 10.6 | 199 | Fire. |
| Propylene diacetate | 9 | 10.75 | 189 | Do. |
| Methyl neodecanoate | 9 | | 204 | Fire—mild report. |
| 2-ethylhexyl acetate | 4.5 | | 199 | Fire—slight report. |
| Butyl neodecanoate | | | 244 | Fire—mild report. |

EXAMPLE 18

Methyl ethyl ketone compositions prepared in dimethyl phthalate or as otherwise indicated and with the diluent concentration as shown below were evaluated by the TCT Test of Example 3.

| Diluent | Concentration, percent | Active oxygen (MEKP) percent | TCT Test |
|---|---|---|---|
| tert-Butyl perbenzoate | 1 | 9.2 | Moderate. |
| Do | 5 | 9.2 | Explosion. |
| tert-Butyl perbenzoate | 1 | 9.2 | Fire. |
| 2-Ethylhexyl acetate | 10 | 9.2 | |
| tert-Butyl perbenzoate | 5 | 9.2 | Mild. |
| 2-Ethylhexyl acetate | 10 | 9.2 | |
| Di-tert-butyl peroxide | 1 | 9.2 | Explosion. |
| Do | 5 | 9.2 | Severe explosion. |
| Di-tert-butyl peroxide | 1 | 9.2 | Fire. |
| 2-Ethylhexyl acetate | 10 | 9.2 | |
| Di-tert-butyl peroxide | 5 | 9.2 | Do. |
| 2-Ethylhexyl acetate | 10 | 9.2 | |
| Butyl benzyl phthalate [1] | | 9.2 | Severe explosion. |
| Amyl pivalate [2] | 10 | | Mild. |
| Dipropylene glycol dibenzoate [2] | | 9.2 | Severe explosion. |
| Amyl pivalate [2] | 10 | 9.2 | Mild. |
| Methyl benzoate [2] | 10 | 9.2 | Do. |
| 2-Ethylhexyl acetate [2] | 10 | 9.2 | Do. |
| Methyl benzoate [3] | 10 | 11 | Fire. |

[1] Butyl benzyl phthalate substituted for dimethyl phthalate as the primary diluent.
[2] Diprophylene glycol dibenzoate substituted for dimethyl phthalate as the primary diluent.
[3] Decanol substituted for dimethyl phthalate as the primary diluent.

EXAMPLE 19

Methyl ethyl peroxide compositions prepared in dimethyl phthalate were diluted as indicated and evaluated by the method of Examples 2 and 3.

| Diluent | Concentration, percent | Active oxygen, percent | Boiling point, °C. | PVT, TCT Test, 4 mm. |
|---|---|---|---|---|
| Butyl lactate | 9 | 10.6 | 190 | Passes, fire. |
| Ethyl 3-hydroxybutyrate | 9 | 11 | 185 | Do. |
| Ethyl 2-hydroxyisobutyrate | 9 | 11 | 149 | Passes. |
| 4-hydroxybutyl benzoate | 9 | 10.6 | >280 | Explosion. |
| 2-hydroxypropyl benzoate | 9 | 10.6 | 270-5 | Mild. |
| 2-hydroxyethyl benzoate | 9 | 10.6 | 270-5 | Very mild. |
| Glycerine diacetate | 9 | 10.6 | 280 | Mild. |
| 2-hydroxyethyl acetate | 9 | 10.6 | 182 | Passes, very mild. |
| Do | 40 | 11 | 182 | Fire. |
| 2-hydroxypropyl acetate | 9 | 11 | 183 | Passes, fire-moderate. |
| 2-hydroxypropyl acetate | 4.5 | 11 | | Fire. |
| N-methylpyrrolidone | 4.5 | | | |
| N-methylpyrrolidone | 9 | 11 | | Mild. |
| 2-hydroxypropyl pivalate | 10 | 9.2 | 198-200 | Smoke. |
| Dimethyl phthalate | | 9.2 | 282 | Moderate. |

We claim:

1. A stable, non-hazardous ketone peroxide composition consisting essentially of a peroxide of a lower ketone containing 4 through 7 carbon atoms, the ketone peroxide concentration being from 7.3 to 14% active oxygen; 3 to 60% of a phlegmatizing ester selected from the group consisting of carboxylic acid esters of monohydric and dihydric alcohols, dicarboxylic acid esters of monohydric alcohols, and carbonates of monohydric alcohols and wherein the boiling point is from about 140 to 250° C.; 0 to 5% hydrogen peroxide; 0 to 50% of a compatible diluent and wherein the total active oxygen concentration does not exceed 15%; and in which the minimum effective concentration of phlegmatizing ester increases with increasing active oxygen content and on approaching the limits of the boiling point of the ester.

2. The composition of claim 1 wherein the boiling point of the phlegamatizing ester is from about 170 to 218° C.

3. The composition of claim 2 wherein the phlegmatizing ester is selected from the group consisting of: cyclohexyl acetate, 2-ethyl-1-hexyl acetate, methyl benzoate, ethyl benzoate, isopropyl benzoate.

4. The composition of claim 3 wherein the phlegmatizing ester is 2-ethyl-1-hexyl acetate.

5. The composition of claim 1 wherein the ketone peroxide is selected from the group consisting of methyl ethyl ketone peroxide and cyclohexanone peroxide.

6. The composition of claim 5 wherein the boiling point of the phlegmatizing ester is from about 170 to 218° C.

7. The composition of claim 6 wherein the phlegmatizing ester is selected from the group consisting of dibutyl carbonate; dimethyl succinate; propylene glycol diacetate; butyl, amyl and hexyl pivalate; and methyl 2-ethylhexanoate.

8. The composition of claim 7 wherein the phlegmatizing ester is dibutyl carbonate.

9. The composition of claim 7 wherein the phlegmatizing ester is dimethyl succinate.

10. The composition of claim 7 wherein the phlegmatizing ester is selected from the group consisting of butyl, amyl and hexyl pivalate.

11. The composition of claim 7 wherein the phlegmatizing ester is methyl-2-ethyl hexanoate.

12. The composition of claim 7 wherein the phlegmatizing ester is propylene glycol diacetate.

13. A stable, non-hazardous ketone peroxide composition consisting essentially of 40–76% methyl ethyl ketone peroxide; 1 to 60% of a phlegmatizing ester selected from the group consisting of carboxylic acid esters of monohydric and dihydric alcohols, dicarboxylic acid esters of monohydric alcohols, and carbonates of monohydric alcohols, and wherein the boiling point is from about 140 to 250° C.; 0 to 5% hydrogen peroxide; 0 to 50% of a phthalate ester and wherein the total active oxygen concentration does not exceed 15%; and in which the concentration of phlegmatizing ester increases with increasing active oxygen content and on approaching the limits of the boiling point range of the ester.

14. The composition of claim 13 in which the boiling point of the phlegmatizing ester is from about 170 to 218° C.

15. The composition of claim 14 wherein the phlegmatizing ester is selected from the group consisting of cyclohexyl acetate, 2-ethyl-1-hexyl acetate, methyl benzoate, ethyl benzoate, isopropyl benzoate.

16. The composition of claim 15 in which the ester is cyclohexyl acetate.

17. The composition of claim 15 in which the ester is 2-ethyl-1-hexyl acetate.

18. A stable non-hazardous ketone peroxide composition consisting essentially of a peroxide of a lower monoketone containing 4 through 7 carbon atoms, the ketone peroxide concentration from 7.3 to 14% active oxygen, 1 to 60% of a phlegmatizing carboxylic ester of a glycol monoether boiling from 145 to 218° C., in which the concentration of phlegmatizing ester increases with active oxygen concentration and approaching the limits of the boiling point range of the ester.

19. The composition of claim 18 wherein the ketone peroxide is in excess of 50% methyl ethyl ketone peroxide.

20. The composition of claim 19 wherein the phlegmatizing ester is from the group consisting of 2-methoxyethyl acetate and 2-ethoxyethyl acetate.

References Cited
UNITED STATES PATENTS

| 2,176,407 | 10/1939 | Milas | 260—610 R |
| 3,324,040 | 6/1967 | Spoor | 252—186 |
| 3,330,871 | 7/1967 | Mageli et al. | 260—610 R |
| 3,428,689 | 2/1969 | Manly | 260—610 A |
| 3,462,370 | 8/1969 | Wintel et al. | 252—186 |
| 3,507,800 | 4/1970 | Leveskis | 252—186 |
| 3,538,011 | 11/1970 | Van der Klaauw | 252—186 |

LEON D. ROSDOL, Primary Examiner

I. GLUCK, Assistant Examiner

U.S. Cl. X.R.

252—99; 260—502 R, 610 R, 610 A